United States Patent [19]

Malinowski

[11] 4,101,785

[45] Jul. 18, 1978

[54] SMOKE DETECTOR WITH SWITCH MEANS FOR INCREASING THE SENSITIVITY

[75] Inventor: William J. Malinowski, Pembroke, Mass.

[73] Assignee: Chloride, Incorporated, Tampa, Fla.

[21] Appl. No.: 798,578

[22] Filed: May 19, 1977

[51] Int. Cl.[2] .............................................. G01N 21/26

[52] U.S. Cl. .................................... 250/574; 340/501; 356/207; 340/630

[58] Field of Search ............ 340/237 R, 237 P, 237 S; 250/564, 573, 574; 356/207, 208

[56] References Cited

U.S. PATENT DOCUMENTS

| | | | |
|---|---|---|---|
| 3,447,370 | 6/1969 | Tanzman | 356/207 |
| 3,809,913 | 5/1974 | Prellwitz | 356/207 |
| 3,936,814 | 2/1976 | Girard | 250/574 |

*Primary Examiner*—David C. Nelms
*Attorney, Agent, or Firm*—Robert E. Ross

[57] ABSTRACT

A smoke detector having manual means or automatic timing means for changing the sensitivity of response.

12 Claims, 5 Drawing Figures

SMOKE DETECTOR WITH SWITCH MEANS FOR INCREASING THE SENSITIVITY

BACKGROUND OF THE INVENTION

Smoke detectors of various types such as ionization and photo-electric are finding increasing use in both residential and industrial structures. These detectors are responsive to a predetermined concentration of smoke to provide an output signal to sound an alarm. For example, one type of detector, utilizing light reflected from smoke particles, onto a photo-responsive device, has circuit parameters such that an alarm is sounded when the smoke concentration reaches a density that will obscure between 1% and 2% of the light in a colum of smoke 1 foot long.

Smoldering fires often take considerable time to produce a smoke concentration of 1%, and it would be desirable to have the alarm actuated at a lesser concentration, for example 0.2% to 0.4%. However, a smoke detector with such a low sensitivity is subject to false alarms from various causes, such as tobacco smoke, cooking smoke, dust, and industrial fumes.

SUMMARY OF THE INVENTION

A smoke detector is provided which has a standard level of sensitivity for use generally during daylight hours, and a substantially higher level of sensitivity for use during darkness or when the space being monitored is unoccupied. The change in sensitivity may be accomplished in any convenient manner, such as by increasing or decreasing the resistance in an appropriate portion of the circuit. The change may be accomplished by a manual switch or by a switch operated automatically by a timer.

Since the causes of most false alarms are generated by the activity of people in the space being monitored, and since in the normal installation when there is no illumination, either natural or artificial, present, it is unlikely that there will be any activities being carried on to generate smoke or dust. Hence during periods of darkness or during extended periods of time when the space is unoccupied, the sensitivity of the detector can be increased without danger of a false alarm occurring from such causes. Such increase in sensitivity at night is particularly desirable since statistics show that 75% of deaths due to smoke occur between 11 P.M. and 6 A.M.

DESCRIPTION OF THE ILLUSTRATED EMBODIMENTS

Figure 1:
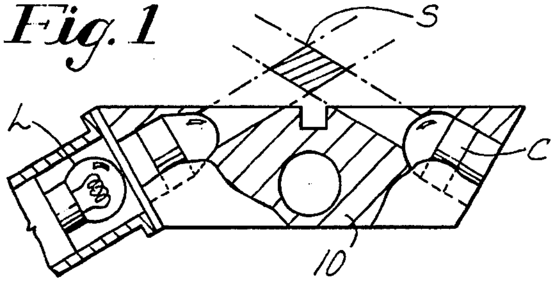
FIG. 1 is a schematic diagram of the optical components of a photo-electric detector of the type with which the present invention can be utilized.

FIG. 1 of the drawing is a schematic diagram of the arrangement of the physical components of a photo-electric smoke detector with which the present invention can be utilized, comprising a support block 10, carrying a light source L positioned to illuminate smoke particles S appearing in the space in front of the block, and a photo-responsive device C viewing the volume illuminated by the light. The light source L may be of incandescent, glow tube, or electronic (light emitting diode) origin, and the photo-responsive device may be photo-resistive or photo-generative, as desired for a particular circuit. The light may be pulsing or continuous.

The block 10 and the associated components may be enclosed in a suitable housing to allow the entrance of ambient atmosphere but to exclude ambient light. Housings for this purpose are well known in the art.

Figure 2:
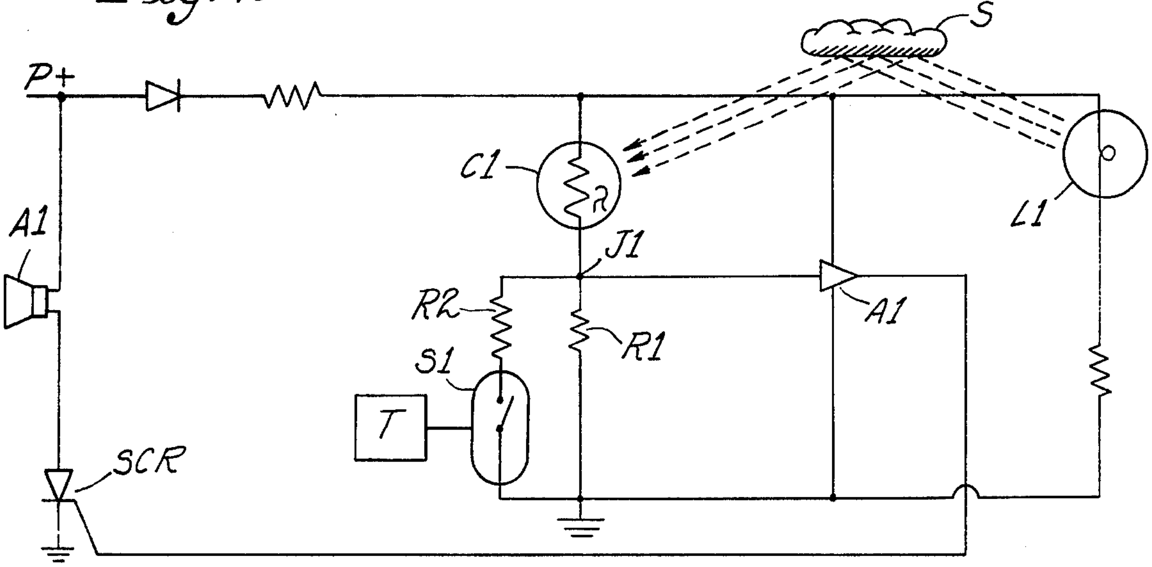
FIG. 2 is a schematic diagram of an electrical circuit of a photo-electric detector embodying the features of the invention.

Referring to FIG. 2, there is illustrated a schematic diagram of an electrical circuit of a smoke detector embodying the invention, comprising a light source L1, a photo-resistive cell C1 connected in series across a power source with a resistor R1 through a junction J1, which junction provides the input to an amplifier A1, the output of which is connected to the gate of a controller switch SCR, the anode and cathode of which are connected in series with an alarm device A1 across the power source. The presence of smoke in the viewing area of the cell C1 illuminated by the light L1 cause C1 to drop in resistance raising the voltage at J1. When the J1 voltage reaches a predetermined value the output of the amplifier becomes high enough to trigger SCR into conduction energizing the alarm A1.

The above-described portion of the circuit is in common use in several types of smoke detectors.

To render said circuit automatically responsive to a decrease in ambient light to increase its sensitivity, a switch S1 is connected in parallel with resistor R1 and in series with limiting resistor R2, which is operable from outside the detector.

During daylight hours, or when the space being monitored by the detector is occupied, the switch S1 is closed. The value of R1 and R2 and the circuit parameters of the amplifier A1 are such that when switch S1 is closed predetermined smoke concentration (such as 2%) is required to lower the resistance of C1 to a value such that the voltage at J1 rises to a value that will actuate the alarm.

However, when the space is unoccupied, or at night, the switch S1 is opened, thereby increasing the resistance between J1 and ground. Hence the resistance drop of cell C1 required to produce the required alarm voltage at J1 is less, and said resistance drop is produced by a lesser smoke concentration.

Figure 3:
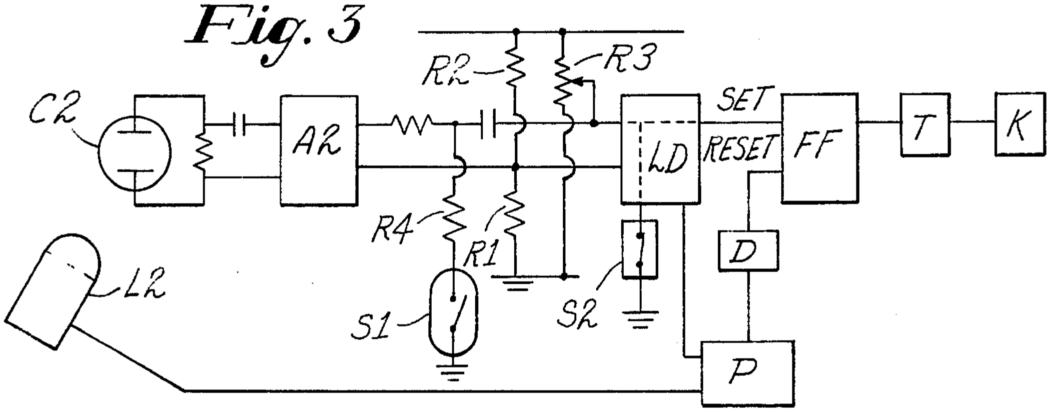
FIG. 3 is a schematic diagram of an electric circuit of another form of photo-electric detector embodying the features of the invention.

Referring to FIG. 3 there is illustrated another form of electronic smoke detector circuit embodying the features of the invention, which comprises a light emitting diode light source L2, a photo-valtaic cell C2 capacitor coupled to an amplifier A2. The amplifier output is connected to the input of a level detector LD, the output of which is connected to the set terminal of a bi-stable switching device such as a flip-flop FF. The flip-flop output is fed through an integrator T to an alarm actuating device K.

A pulse generator P supplies pulses to energize the light emitting diode L2, to turn on the level detector LD, to re-set the flip-flop FF and to the normally closed electronic switch S2, connected from the signal lead to ground, to open said switch during the time that L2 is emitting light and the level detector is energized.

Light reflected from smoke particles illuminated by L2 pulse falls on the photo-voltaic cell C2 causing a voltage pulse which is amplified by the amplifier A2, the output of which, if of sufficient magnitude, passes through the level detector to the set terminal of the flip-flop to provide an output signal to the integrator, which signal continues until the beginning of the next pulse. The discriminator D converts the pulse from the pulse generator into a spike pulse to the flip-flop re-set terminal at the beginning of each pulse cycle, so that at the start of each pulse, the flip-flop output is turned off. Two or more consecutive output signals into the integrator may be required to actuate the alarm.

The above-described smoke detector circuit is described and claimed in my U.S. Pat. No. 3,946,241 issued May 23, 1976, and as shown therein, provides means for making minor adjustments in the sensitivity of the device, to compensate for variations in the electrical characteristics of the various components, said means comprising voltage divider resistors R1 and R2 connected across the power source, with their junction connected to one of the inputs to the level detector, and a variable resistor R3 connected across the power source, with the tap thereof connected to the other input to the level detector. The sensitivity adjustment provided by resistors R3 is accomplished during the manufacturing process and is not thereafter adjusted, except possibly during repair of the unit.

To enable the sensitivity of the circuit to be increased when desired, switch S1 is connected in series with a resistor R4 between one of the amplifier output terminals and ground.

During periods when the space being monitored is occupied, the switch S1 is closed so that the resistance from the signal lead to ground is substantially that of the resistor R4.

Therefore a portion of the amplifier A2 output flows to ground, and the circuit parameters are such that when the concentration of smoke (with the switch closed) reaches the level at which the alarm is to be sounded, the amplifier output is high enough to cause the level detector to provide an output signal to the flip-flop.

However, when the space is to be unoccupied, or at night, the switch S1 is opened, so that there is no longer a path to grond through R4. A lesser output from amplifier A2 is therefore required to provide the signal level required to produce an output signal from the level detector, and since this smaller amplifier output can be produced by a lesser concentration of smoke viewed by the cell C2, the detector is more sensitive under conditions of low ambient light.

Figure 4:
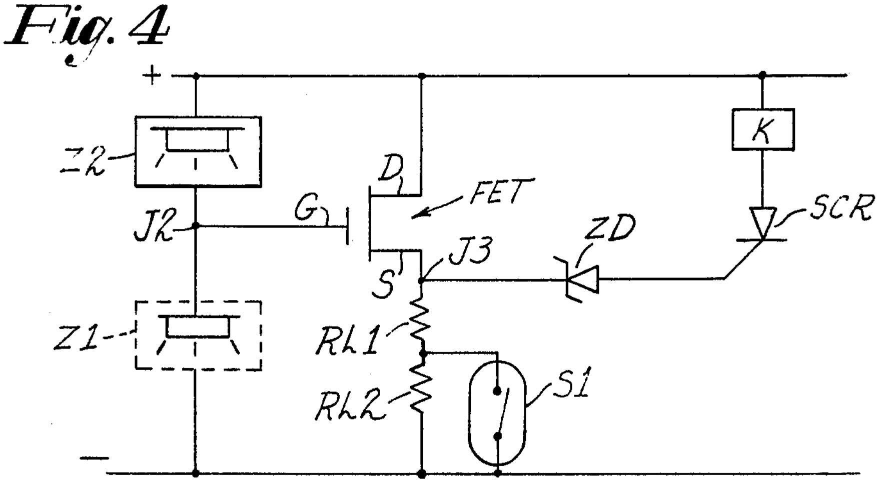
FIG. 4 is a schematic diagram of an electric circuit of an ionization smoke detector embodying the features of the invention.

Referring to FIG. 4 of the drawing, there is illustrated a smoke detector of the ionization type embodying the features of the invention, comprising an open ionization chamber Z1 and a closed ionization chamber Z2 connected in series through a junction J2 across a power source, said junction being connected to the gate of a field effect transistor FET, the source-drain path of which is connected across the power source. The output signal from the field affect transistor is taken across the resistance between the source electrode S and the negative supply terminal, which signal is applied to the gate of a silicon-controlled rectifier SCR, the anode-cathode path of which is connected in series with an alarm K across the power source.

The power source provides a constant ionization current through both ionization chambers. When there is no smoke present in the ambient air, the voltage at junction J2 has a predetermined value.

Under these conditions the current through the source-drain path of the field effect transistor is either zero or has a value such that the voltage drop across the load resistance (between S and the negative supply terminal) does not exceed the breakdown voltage of the zener diode ZD. Hence no signal is applied to the gate of SCR.

When smoke enters the open ionization chamber Z1, its impedence is increased and ionization current will decrease, which causes the voltage at junction J2 to increase, which increases the potential at gate electrode G of the FET. The current in the source-drain path of FET therefore increases, which increases the voltage across load resistors RL1 and RL2. If the amount of smoke is sufficient to produce the required voltage between the source electrode S and the negative supply, the SCR will be triggered into conduction, actuating the alarm K.

The above-described portion of the circuit is a standard circuit used in commercial ionization detectors.

To provide means for changing the sensitivity of said detector, a switch S1 is connected in parallel with load resistor RL2.

During periods when it is desired that the detector not have maximum sensitivity, the switch S1 is kept closed, so that more current is required through the FET source-drain path to provide the necessary SCR trigger voltage, than is required when the switch is open, since the resistance from J2 to the negative side of the power line is greater when the switch is open than when the switch is closed.

The amount of smoke at ionization chamber Z1 necessary to provide the SCR trigger voltage is therefore less when the switch is open than when the switch is closed.

In each of the above-described modifications of the invention, the range of sensitivity of the detector is maintained between predetermined upper and lower limits by the associated circuitry. For example in FIG. 2, the maximum sensitivity, occuring when the switch S1 is open cannot exceed a value determined by the resistor R1; and the minimum sensitivity, occurring when the switch is closed, cannot go below a value determined by resistor R2.

Figure 5:
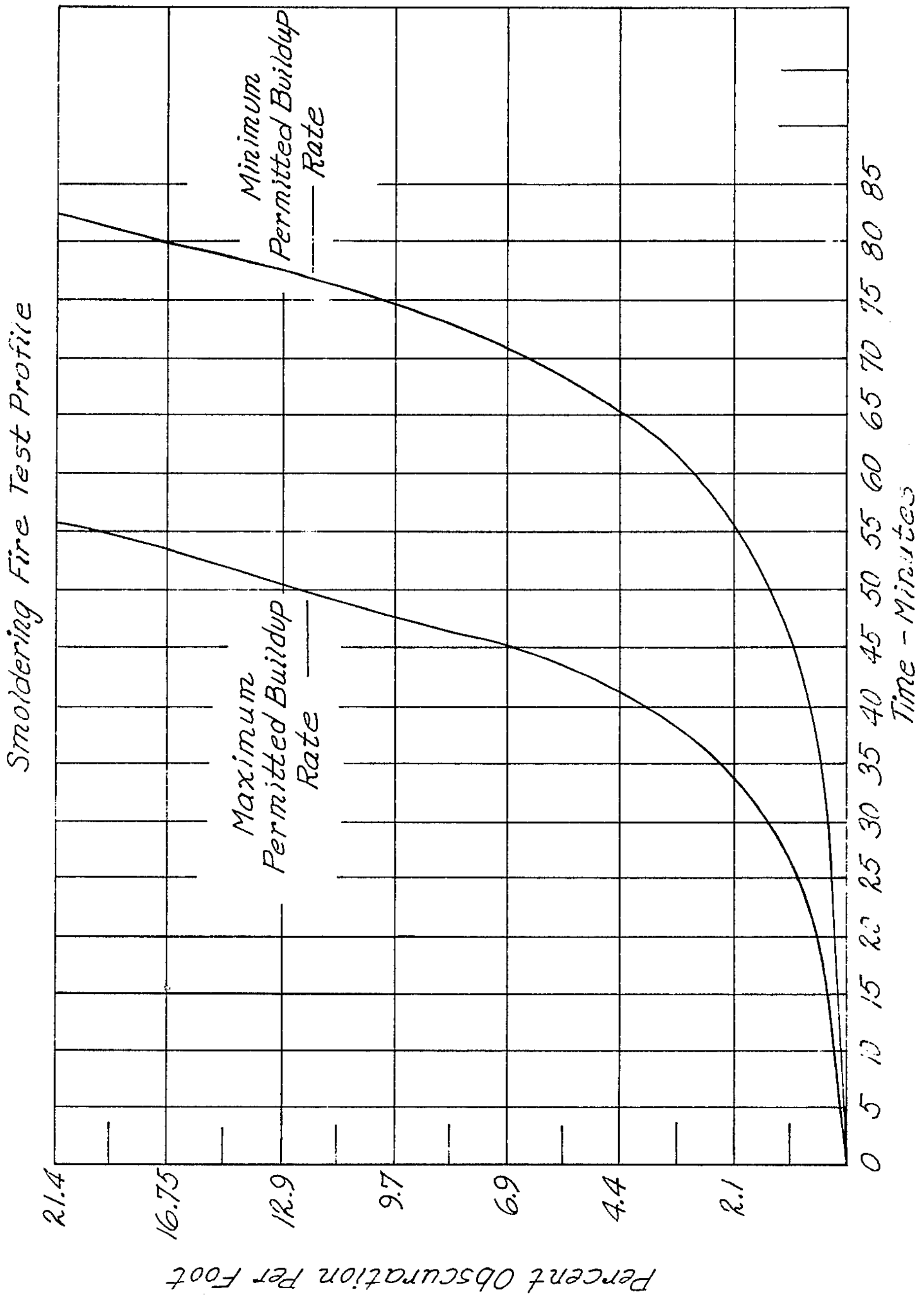
FIG. 5 is a graph used by Underwriter's Laboratories illustrating typical rates of build up of smoke from smoldering fires, used in a test of detector response, with percent obscuration per foot plotted against time.

Referring to FIG. 5, there is illustrated a graph illustrating maximum and minimum permitted rates of smoke build-up permitted in an Underwriters' Laboratory standard smolering fire test. With the illustrated rates of buildup, a detector set to alarm at a smoke density of 2.0% obscuration per foot will alarm, at maximum rate build-up in about 6 minutes, and at the minimum build-up rate in about 20 minutes.

Thus the increase in sensitivity from a 2% alarm point to a 0.2% alarm point gives an alarm 27 minutes earlier at the maximum permitted test rate and 34 minutes earlier at the minimum permitted test rate.

As previously stated, 75% of deaths from residence fires occur at night, and it has also been determined that 75% of residence fires are of the smoldering type. Hence the provision of means to increase the sensitivity to shorten the alarm time is obviously very desirable.

The switch S1 in any of the above -described embodiments of the invention may be a mechanical switch or an electronic switch, and may be arranged to be operated manually or automatically by a timer. A timer may be incorporated into the smoke detector, or it may be connected to an external timer.

For example, the heating systems of many buildings have an automatic timer that lowers the temperature at which the building is maintained at night, and in some installations over a weekend. The switch S1 could be connected into such a heating system timer T, (see FIG. 2), to increase the sensitivity of the detector, at the same time that the timer lowers the building temperature, and closed to reduce the sensitivity of the detector when the timer returns the building to the normal daytime temperature.

Although in the embodiments of the invention herein illustrated, the switch is so connected into the circuit that opening switch increases the sensitivity of the detector, it will be understood that if desired the switch could be connected so as to operate in the reverse manner, in which the detector would be in the more sensitive condition when the switch is closed.

For example, in FIG. 2, the switch S1 could be connected in series with a load resistor of suitable value, between the positive side of the power source and the junction J1, so that the switch and its lead resistor are in parallel with the cell C1. Hence when the switch is closed, the detector would be more sensitive, since less light in cell C1 would be required to provide the necessary input to amplifier A1.

Many modifications of the herein-described embodiments of the invention may be made, since it will be apparent to one skilled in the art that the switch S1 can be incorporated into the illustrated circuits in various ways, with the same result.

Since other modifications in the above-illustrated embodiments of the invention may be made by one skilled in the art without departing from the scope of the invention, it is intended that all the matter disclosed herein be interpreted in an illustrative and not a limiting sense.

I claim:

1. A smoke detector comprising smoke responsive means and associated circuitry producing a signal output which is a function of smoke concentration and level detector means responsive to said signal of a predetermined level to actuate alarm energizing means, and switch means so connected into said circuit that when the switch isin a first condition, the alarm is actuated at a lower smoke concentration than when the switch is in a second condition.

2. A smoke detector as set out in claim 1 in which timing means is provided to transfer said switch from one condition to the other condition at predetermined times.

3. A smoke detector as set out in claim 2 in which said timing means transfers said switch to the first condition during the hours of darkness, and to the second condition during the hours of daylight.

4. A smoke detector as set out in claim 2 in which said timer is a control for a heating system, and is set to decrease the temperature of the space being monitored by the detector and to transfer the switch to the first condition at a predetermined time and to increase the temperature of the space being monitored and to transfer the switch to the second condition at a subsequent time.

5. A smoke detector as set out in claim 1 in which said switch is so connected into the circuit that when the switch is in one condition the signal output is greater for a given smoke concentration than when the switch is in the other condition.

6. A smoke detector as set out in claim 1 in which said switch is so connected into the circuit that when the switch is in one condition, the signal level at which the level detector actuates the alarm energizing means is substantially lower than when the switch is in the other condition.

7. In a smoke detector, comprising a photo-responsive means producing an output signal which is a function of smoke concentration, means for amplifying said output signal, and level detector means responsive to an amplified signal above a predetermined level to energize alarm actuating means, the improvement comprising bi-stable switch means so associated with said detector that when the switch is in one condition, the alarm is actuated at a substantially lower smoke concentration than when the switch is in the other condition.

8. A smoke detector as set out in claim 7 in which said switch is so connected into said circuit as to cause the output signal to be greater for a given smoke concentration in one condition than in the other condition.

9. A smoke detector as set out in claim 7 in which said switch is so connected that when the switch is in one condition the amplifier output is greater, for a given smoke concentration, than when the switch is in the other condition.

10. A smoke detector as set out in claim 7 in which said switch is so connected that when the switch is in one condition, the level detector is responsive to a lower level of amplified signal to actuate the alarm energizing means than when the switch is in the other condition.

11. An ionization smoke detector, comprising an ionization chamber, means responsive to the decrease in current through said chamber to provide an output signal, means responsive to said output signal of a predetermined value to energize alarm actuating means, and switch means so connected into said detector that when said switch is in one condition, the alarm is actuated at a lower smoke concentration than when the switch is in the other condition.

12. A detector as set out in claim 11 in which the switch is so connected that when in one condition the output signal is less for a given smoke concentration than when the switch is in the other condition.

* * * * *